United States Patent
Nakano et al.

(10) Patent No.: US 6,523,637 B1
(45) Date of Patent: Feb. 25, 2003

(54) STEERING APPARATUS FOR AUTOMOBILE

(75) Inventors: Shiro Nakano, Chihayaakasaka-mura (JP); Hideki Higashira, Ikoma (JP); Manabu Takaoka, Kashiba (JP); Hiroshi Kawaguchi, Mishima (JP)

(73) Assignees: Koyo Seiko Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/020,132

(22) Filed: Feb. 6, 1998

(30) Foreign Application Priority Data

Feb. 7, 1997 (JP) ............................................ 9-025660

(51) Int. Cl.⁷ ................................................ B62D 5/04
(52) U.S. Cl. ...................................... 180/402; 180/446
(58) Field of Search ................................ 180/402, 403, 180/405–407, 446, 443, 422; 701/41–43

(56) References Cited

U.S. PATENT DOCUMENTS

| | | | | |
|---|---|---|---|---|
| 4,741,409 A | * | 5/1988 | Westercamp et al. | ......... 180/79 |
| 4,957,182 A | * | 9/1990 | Morishita et al. | .......... 180/79.1 |
| 5,065,325 A | * | 11/1991 | Takahashi | .............. 364/424.05 |
| 5,097,917 A | * | 3/1992 | Serizawa et al. | .......... 180/79.1 |
| 5,201,380 A | * | 4/1993 | Callahan | ...................... 180/132 |
| 5,236,335 A | * | 8/1993 | Takeuchi et al. | ........... 180/79.1 |
| 5,247,441 A | * | 9/1993 | Serizawa et al. | ...... 364/424.05 |
| 5,327,986 A | * | 7/1994 | Saita | ......................... 180/79.1 |
| 5,440,487 A | * | 8/1995 | Althoff et al. | ......... 364/424.05 |
| 5,528,497 A | * | 6/1996 | Yamamoto et al. | .... 364/424.05 |
| 5,549,173 A | * | 8/1996 | Tomita | ........................ 180/417 |
| 5,554,969 A | * | 9/1996 | Eguchi | ........................ 340/438 |
| 5,636,703 A | * | 6/1997 | Papke et al. | ................. 180/400 |
| 5,652,487 A | * | 7/1997 | Nishino et al. | .............. 318/434 |
| 5,653,304 A | * | 8/1997 | Renfroe | ....................... 180/402 |
| 5,767,642 A | * | 6/1998 | Furukawa | .................... 318/286 |
| 5,810,108 A | * | 9/1998 | Jung et al. | .................. 180/404 |
| 5,828,972 A | * | 10/1998 | Asanuma et al. | ............. 701/41 |
| 5,845,222 A | * | 12/1998 | Yamamoto et al. | ........... 701/41 |
| 5,862,878 A | * | 1/1999 | Bohner et al. | .............. 180/403 |
| 5,884,724 A | * | 3/1999 | Bohner et al. | .............. 180/402 |
| 5,893,427 A | * | 4/1999 | Bohner et al. | .............. 180/403 |
| 5,908,457 A | * | 6/1999 | Higashira et al. | ............. 701/41 |
| 6,047,788 A | * | 4/2000 | Bohner et al. | .............. 180/406 |
| 6,059,068 A | * | 5/2000 | Kato et al. | ................... 180/402 |
| 6,176,341 B1 | * | 1/2001 | Ansari | ........................ 180/402 |

FOREIGN PATENT DOCUMENTS

| | | |
|---|---|---|
| EP | 522 555 | 1/1993 |
| EP | 531 962 | 3/1993 |
| GB | 2 259 892 | 3/1993 |
| JP | 2-297017 | 8/1990 |
| JP | 4-271964 | 9/1990 |

* cited by examiner

Primary Examiner—Robert P. Olszewski
Assistant Examiner—Andrew J. Fischer
(74) Attorney, Agent, or Firm—Darby & Darby

(57) ABSTRACT

A steering apparatus for automobiles having steering operating means which is not mechanically connected to a steering mechanism, a pair of steering motors provided to different positions in the steering mechanism, and a steering control unit for distributing a necessary steering force which is obtained on the basis of a deviation between an operating position of the steering operating means and an actual operating position of the steering mechanism in a prescribed ratio so as to determine target values of the outputs of the steering motors.

4 Claims, 6 Drawing Sheets

STEERING APPARATUS FOR AUTOMOBILE

BACKGROUND OF THE INVENTION

The present invention relates to a steering apparatus for automobiles for directing steerable wheels by a steering mechanism which is not mechanically connected to a steering operating means according to an operation by an operator.

An automobile is steered by transmitting an operation of a steering operating means (in general, rotation of a steering wheel) provided in a vehicle chamber to a steering mechanism provided outside of the vehicle chamber so that steerable wheels (in general, front steerable wheels) for steering are directed.

As the steering mechanism for automobiles, various mechanisms such as ball-screw type and rack-pinion type mechanisms are put to practical use. For example, in the rack-pinion type-mechanism they are arranged so that sliding of a rack shaft which is extended in the right-and-left direction at the front portion of the body of a car, in a shaft-length direction is transmitted to a knuckle arm provided to right and left front steerable wheels via a tie rod. In this mechanism, a pinion fitted into a top end of a rotation shaft (steering column) of a steering wheel extended on the outside of the vehicle chamber is engaged with a rack gear disposed in a midway of the rack shaft, and the rotation of the steering wheel is converted into sliding in the shaft-length direction of the rack shaft so that steering is performed according to the rotation of the steering wheel.

In addition, in recent years, a power steering apparatus is spread widely. Such power steering apparatus is arranged so that actuators for helping steering such as a hydraulic cylinder and an electric motor are provided in a midway of the steering mechanism, the actuator is driven on the basis of a detected result of a steering force applied to the steering wheel for steering, and an operation of the steering mechanism according to the rotation of the steering wheel is assisted by an output of the actuator, and thus driver's effort at steering is reduced.

However, in such a conventional steering apparatus, since the steering wheel is connected mechanically to the steering mechanism regardless of the provision of the arrangement as a power steering apparatus, there arises problems such that a position in the vehicle chamber where the steering wheel is placed is limited, and that a degree of freedom of a layout in the vehicle chamber is restricted. Moreover, the realization of the connection requires large-bulk connecting members, and thus realization of lightening of cars is obstructed.

In order to solve such problems, there is suggested a separation-type steering apparatus which is arranged so that the steering wheel as steering operating means is not mechanically connected to the steering mechanism, meanwhile similarly to the actuator for assisting the steering in the power steering apparatus, the actuator for steering is provided in the midway of the steering mechanism, the actuator is operated on the basis of a detected result of an operating direction and operating amount of the steering operating means, thereby applying a steering force to the steering mechanism, the steering is thus performed according to the operation of the steering operating means.

In addition to the advantage of solving the above problems, the aforementioned separation-type steering apparatus has an advantage that since a relationship between an operating amount of the steering operating means and an operating amount of the steering actuator can be set without any mechanical limitation, it can cope with the change of steering characteristics according to a running state of an automobile such as the speed, a degree of turning, and an increase and decrease in the speed flexibly, and suitable steering operating means such as a lever, hand grip and pedal can be adopted instead of the steering wheel, and a degree of freedom of design is improved.

Further, the separation-type steering apparatus has an advantage such that rising of the steering wheel due to a head-on collision of an automobile can be prevented substantially completely, safety in a collision can be improved, and this apparatus can easily cope with automatic driving systems such as ITS (Intelligent Transport Systems) and AHS (Automated Highway Systems) which are being developed in recent years. Namely, the separation-type steering apparatus has a lot of advantages which cannot be realized in the conventional steering apparatuses, so it is watched with interest as an useful apparatus for developing automobile technique.

Here, as the steering actuator for applying a steering force to the steering mechanism, considering the ease of changing the steering characteristic according to the running state, an electric motor (steering motor) is generally used. Moreover, the steering operating means separated from the steering mechanism is provided with reaction force applying means having a motor and a gear mechanism, and when the reaction force applying means applies a suitable reaction force to the steering operating means, it can perform the steering operation in like a manner in the apparatus where the steering operating means is mechanically connected to the steering mechanism.

When the separation-type steering apparatus having the above arrangement is compared with the power steering apparatus used widely, the steering in the latter apparatus is performed by the combined force of an operating force applied to the steering wheel as the steering operating means and an output of the motor for helping the steering provided to the steering mechanism, but the steering in the former apparatus is performed only by an output of the steering motor provided to the steering mechanism.

Therefore, as the steering motor used in the separation-type steering apparatus, compared with the motor for helping the steering used in the power steering apparatus, higher-powered motor is required, so there arises a problem that it is difficult to secure a position, where the large-size steering motor according to the large power is placed, in the vicinity of the steering mechanism.

Further, if the motor for assisting the steering breaks down in the power steering apparatus, since only a steering helping power is lost, the steering can be performed by the operating force applied to the steering wheel, but if the steering motor breaks down in the separation-type steering apparatus, there is a possibility that the steering becomes difficult.

BRIEF SUMMARY OF THE INVENTION

The present invention has been devised to solve the above problems. It is an object of the present invention to provide a separation-type steering apparatus for automobiles which easily secure a position in the vicinity of a steering mechanism where a steering motor is placed, and can previously prevent steering from becoming difficult even if the steering motor breaks down.

The steering apparatus for automobiles according to the present invention is characterized by including steering operating means which is not mechanically connected to a steering mechanism, a pair of steering motors provided to different positions in the steering mechanism, and a steering control unit for distributing a necessary steering force obtained on the basis of a deviation between an operating position of the steering operating means and actual operating position of the steering mechanism in a prescribed ratio so as to determine target value of the outputs of the steering motors. Since a combined force of a pair of the steering motors is applied to the steering mechanism to perform the steering, both the steering motors can be miniaturized, and thus their provision to the circumference of the steering mechanism becomes easy.

In addition, the apparatus is characterized in that the steering control unit includes means for judging as to whether or not malfunction exists in said steering motors and the relevant electrical and mechanical part thereto, and fail-safe means for changing the distribution ratio so that an output of the steering motor on a malfunction side is forbidden according to the judgment and the output of the steering motor on the non-malfunction side is increased. As a result, when one of the steering motors malfunctions, the operation of the malfunctioned steering motor is forbidden by changing the distribution ratio according to the judgment of the malfunction, and the output of the steering motor on the non-malfunction side is increased, and the steering can be performed by one steering motor.

In addition, the apparatus is characterized in that the steering control unit obtains a normal output according to the distribution ratio and a fail output corresponding to the whole of the necessary steering force for each of the steering motors, and the fail-safe means changes the normal output into the fail output for the steering motor on the non-malfunction side. As a result, the fail output corresponding to the whole of the necessary steering force is obtained for each of the steering motors during the normal operation, and if one steering motor malfunctions, the target value of the output of the other steering motor is changed into the fail output so that this steering motor immediately generates the whole of the necessary steering force shared by a pair of the steering motors before the malfunction, and thus an abrupt change in the steering force due to the changing can be prevented.

The above and further objects and features of the invention will more fully be apparent from the following detailed description with accompanying drawings.

DETAILED DESCRIPTION OF THE INVENTION

Figure 1:
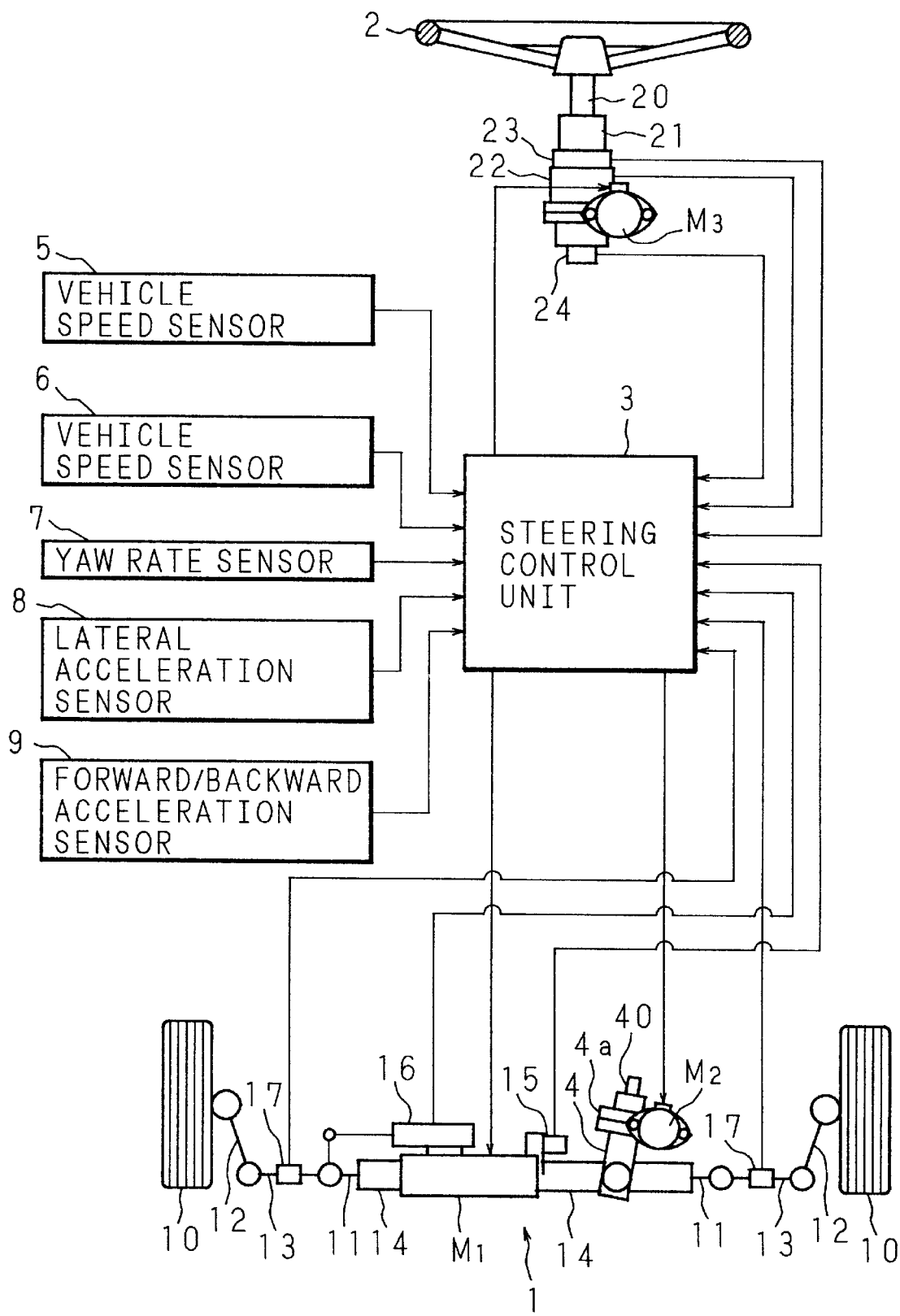
FIG. 1 is a block diagram showing a whole arrangement of a steering apparatus for automobiles of the present invention.

The following details embodiments of the present invention on reference to the drawings. FIG. 1 is a block diagram showing a whole structure of a steering apparatus for automobiles of the present invention. The steering apparatus has a steering mechanism 1 for directing a pair of steerable wheels 10 provided to the right and left of a car body, a steering wheel 2 which is a steering operating means provided separately from the steering mechanism 1, and a steering control unit 3 for performing a control operation, mentioned later, so as to operate the steering mechanism 1 according to the operation of the steering wheel 2.

The steering mechanism 1 is a known rack pinion-type steering mechanism, in which both ends of a rack shaft 11 which extends in the right-and-left direction of the car body and slides in a shaft-length direction are respectively connected to knuckle arms 12 of the steerable wheels 10 for steering via tie rods 13, and the knuckle arms 12 are pushed or pulled via the tie rods 13 by the sliding of the rack shaft 11 to both the directions to direct the steerable wheels 10 rightwards or leftwards.

The apparatus of the present invention for performing the directing has a main steering motor $M_1$ and a sub-steering motor $M_2$. The main steering motor $M_1$ is mounted integrally in a midway of a rack housing 14 which supports the rack shaft 11 so that the rack shaft 11 freely slides in the shaft-length direction, and the sub-steering motor $M_2$ is mounted to a pinion housing 4 which is provided with connection to the rack housing 14 so as to intersect a portion of the rack housing 14. The steerable wheels 10 are directed by converting the rotations of the main steering motor $M_1$ and sub-steering motor $M_2$ into the sliding of the rack shaft 11 by respective motion converting mechanisms.

Figure 2:
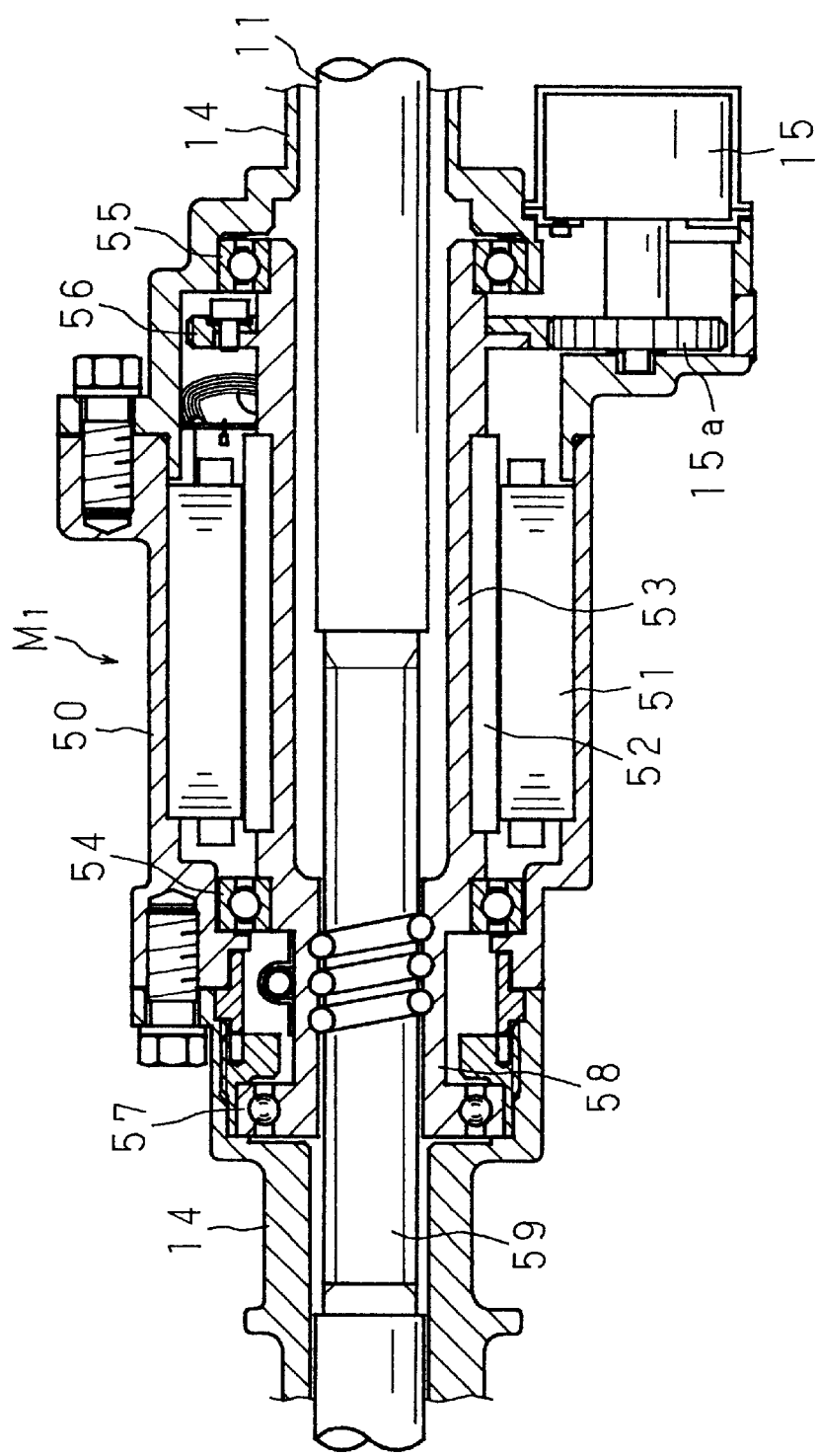
FIG. 2 is a longitudinal section showing a main section of a main steering motor and motion converting mechanism.

FIG. 2 is a longitudinal section showing the arrangement of the main steering motor $M_1$ and the motion converting mechanism. As shown in the drawing, the main steering motor $M_1$ has a stator 51 provided on the inner surface of a motor housing 50 provided integrally in the midway of the rack housing 14 supporting the rack shaft 11 capable of freely sliding in the shaft-length direction, and has a rotor 52 which is provided on the inner side from the stator 51 so as to face the stator 51 at a slight interval. Therefore, the main steering motor $M_1$ is structured as a three-phase brushless motor.

The rotor 52 is fixed to the outer circumference of a cylindrical rotor drum 53 having an inner diameter larger than an outer diameter of the rack shaft 11. The rotor 52 is supported with the rotor drum 53 at both the sides by ball bearings 54 and 55 which are respectively fitted in one side of the motor housing 50 and the rack housing 14 connected to the other side of the motor housing 50, and is supported so as to be freely rotated coaxially on the inner side from the stator 51. When applying current to the stator 51 according to a motion instructing signal applied from the steering control unit 3, the rotor 52 rotates in the normal and reverse directions with the rotor drum 53.

A gear 56 is mounted to the outer circumference of one side of the rotor drum 53 (supported side by the ball bearing 55). The gear 56 is engaged with an input gear 15a of a rotation angle sensor 15 composed of a rotary encoder fixed to the outside of a corresponding portion of the rack housing 14, and a rotation position of the rotor 52 which rotates integrally with the rotor drum 53 is obtained as an output of the rotation angle sensor 15. Here, the configuration of the rotation angle sensor 15 is not limited to this, so for example, the rotation angle sensor 15 can be configured so that a magnetoelectric pick up is placed in an outer circumference of the gear 56 so as to detect teeth of the gear 56, and the rotation position is known by counting a number of the teeth.

The other side of the rotor drum 53 is extended over the portion supported by the ball bearing 54, and is supported in the rack housing 14 by the ball bearing 57 formed integrally with the extended end. The extended portion, namely, the portion between the supported portions by the ball bearings 54 and 57, is made to be a ball nut 58 on the inner surface of which a rail of a ball screw is formed. Meanwhile, a ball screw portion 59 on the outer surface of which has a rail with prescribed length of a ball screw is formed in the midway portion of the rack shaft 11, and the ball screw portion 59 and the ball nut 58 are screwed via a lot of balls so that a ball screw mechanism is structured.

The axial rotation of the rack shaft 11 is restricted by a rotation restricting means which is provided between the rack shaft 11 and the rack housing 14. The rotation of the main steering motor $M_1$, namely, the rotation of the rotor 52 according to applying of current to the stator 51 is directly converted into the sliding of the rack shaft 11 in the shaft-length direction by the screwing of the ball nut 58 connected to one side of the rotator drum 53 and the ball screw portion 59 formed integrally with the rack shaft 11. In such a manner, the steering (directing of the steerable wheels 10 for steering) is performed according to the rotation of the main steering motor $M_1$.

Figure 3:
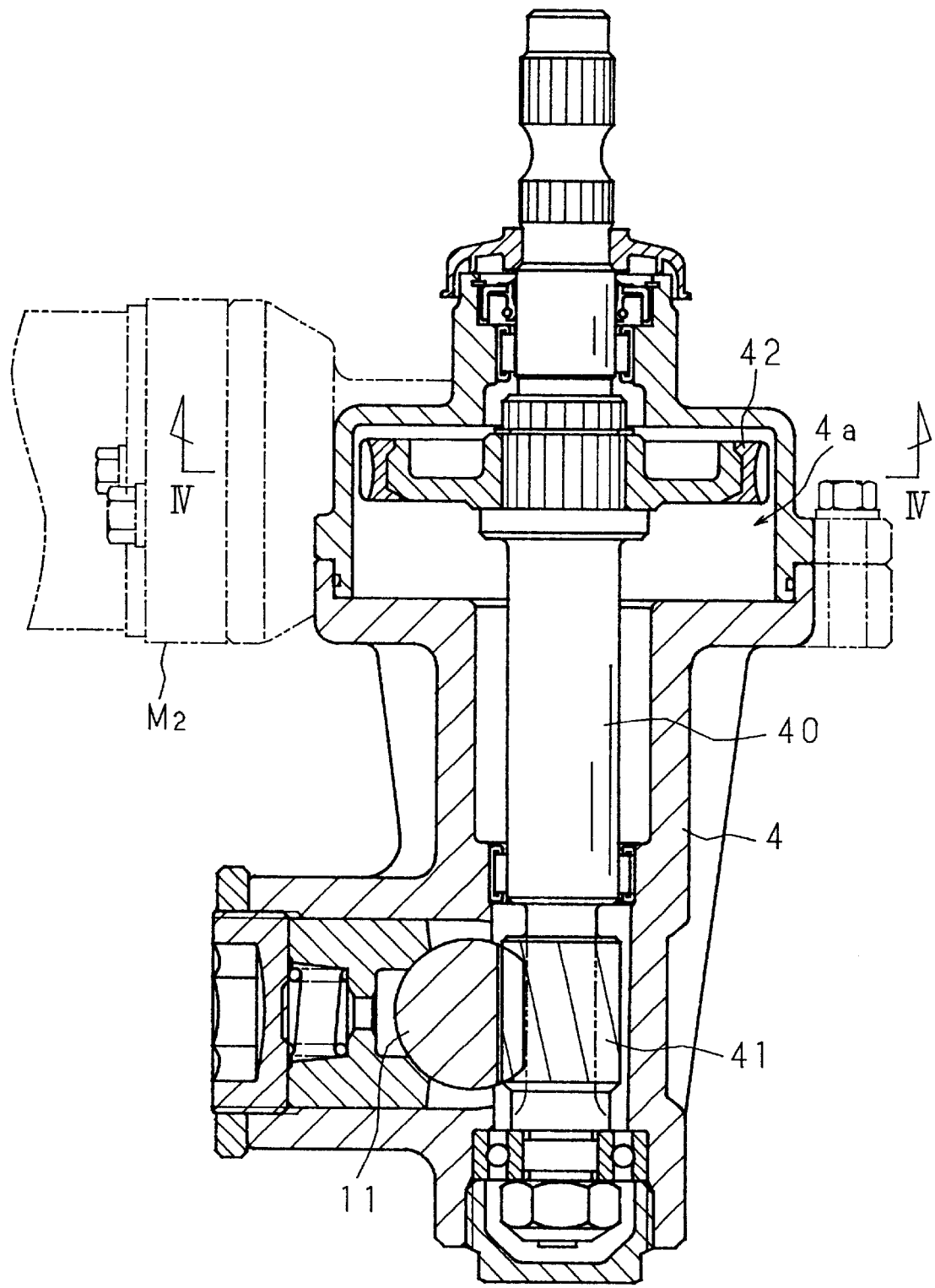
FIG. 3 is a longitudinal section of the vicinity of a position where a sub-steering motor is attached.
Figure 4:
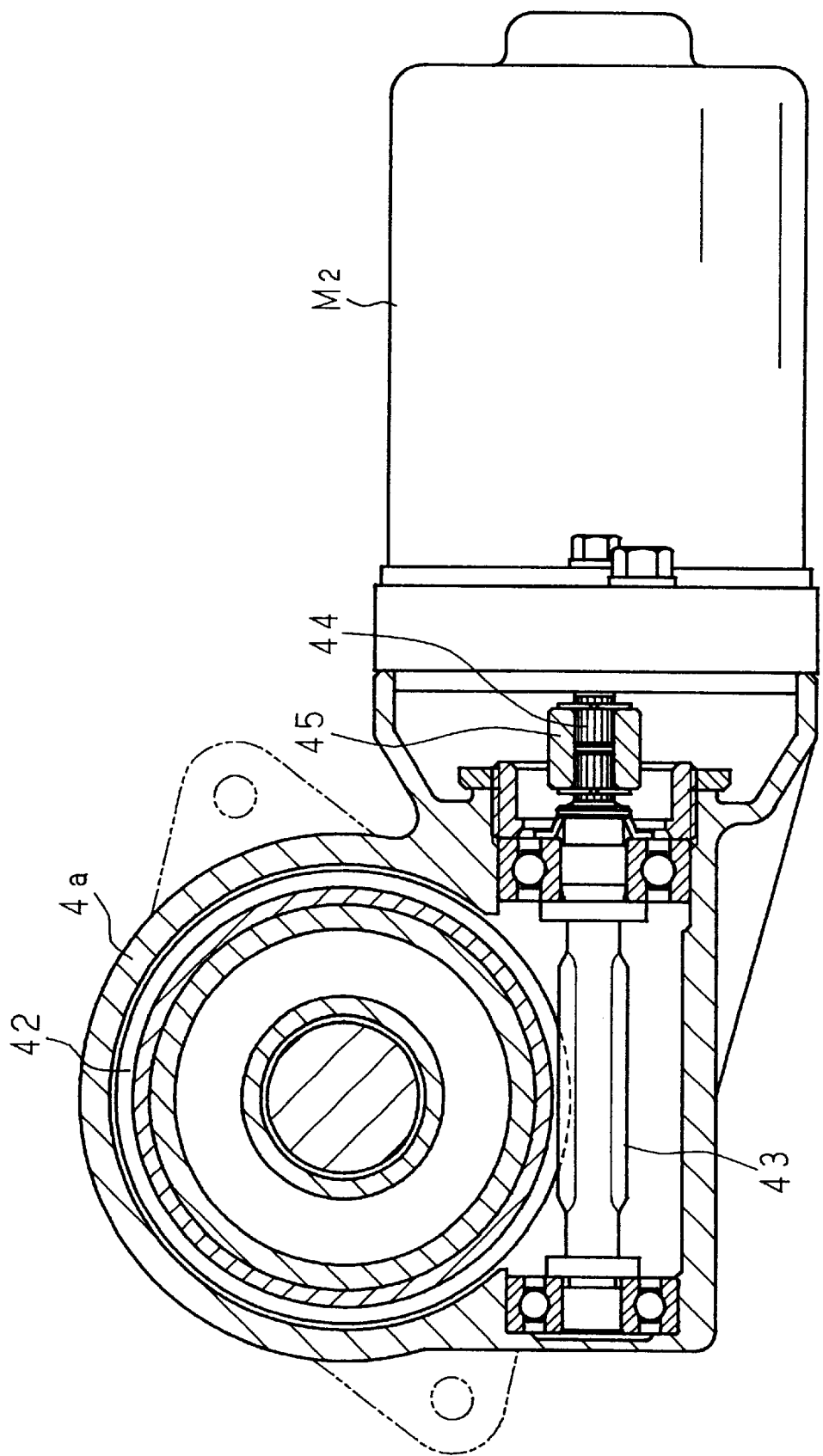
FIG. 4 is a transverse section taken along line IV—IV of FIG. 3.

FIG. 3 is a longitudinal section showing the vicinity of the position where the sub-steering motor (DC motor) $M_2$ is mounted, and FIG. 4 is a transverse section taken along line IV—IV in FIG. 3. A pinion shaft 40 is supported in the pinion housing 4 which intersects the rack housing 14 so as to be able to rotate axially. The pinion shaft 40 has a pinion 41 which is engaged with the rack teeth formed on the corresponding portion of the rack shaft 11 integrally in the portion where the pinion shaft 40 intersects the rack housing 14, and the rotation of the pinion shaft 40 is converted into the sliding of the rack shaft 11 in the shaft-length direction by the engagement of the pinion 41 with the rack teeth. In the present embodiment, the pinion 41 which is engaged with the rack shaft 11 serves as the motion converting mechanism of the sub-steering motor $M_2$.

In the midway portion of the pinion shaft 40, a worm wheel 42 is fitted to be fixed coaxially in a gear chamber 4a which is formed by enlarging a diameter of one portion of the pinion housing 4. A worm 43 supported to the inside of the gear chamber 4a is engaged with a suitable position in the outer circumference of the worm wheel 42. The sub-steering motor $M_2$ is fixed to the outside of the gear chamber 4a, and the top end of an output shaft 44 which comes into the gear chamber 4a is connected coaxially to a base end of the worm 43 via a sleeve-like coupling 45.

When the sub-steering motor $M_2$ is rotated in the above structure, the worm 43 is rotated around the axis, this rotation is transmitted to the pinion shaft 40 via the worm wheel 42, the pinion 41 which is formed integrally with the pinion shaft 40 is rotated, and this rotation is converted into the sliding of the rack shaft 11 in the shaft-length direction. In such a manner, the steering is performed according to the rotation of the sub-steering motor $M_2$.

Motion instructions are given from the steering control unit 3 to the main steering motor $M_1$ and sub-steering motor $M_2$ via respective driving circuits, and both the steering motors $M_1$ and $M_2$ are independently driven according to the motion instructions. An operation amount of the steering mechanism 1 according to the driving is detected by a tie rod displacement sensor 16 for detecting displacement of the connecting portion between the rack shaft 11 and one tie rod 13, and it is given to the steering control unit 3 as a signal showing an actual steering angle $\theta_2$ of the steerable wheels 10 for steering.

As roughly shown in FIG. 1, the tie rod displacement sensor 16 detects a desired displacement amount using a moving amount of a detecting cylinder, which is provided between the connecting portion and the outside of the rack housing 14, as a medium. In the drawing, one tie rod displacement sensor 16 is mounted to one tie rod 13, but since a detected value of the actual steering angle $\theta_2$ is imported in the operation of the apparatus of the present invention, it is desirable that a plurality of tie rod displacement sensors are provided to one or both tie rods 13 in order to prepare for malfunctions.

In addition, tie rod axial force sensors 17 for detecting axial forces applied to the tie rods 13 in their the axial direction (tension or compressive force) are respectively provided to the tie rods 13, and their detected results are given to the steering control unit 3 as signals showing road surface reaction forces applied to the steerable wheels 10 for steering according to the steering. For example, a distortion gauges are respectively stuck to the surface of the tie rods 13, and the tie rod axial force sensors 17 detects the road surface reaction forces using distortion of the tie rods 13 as medium.

The steering wheel 2 which is provided so as not to be mechanically connected to the steering mechanism 1 for performing the above steering operation is, as shown in FIG. 1, supported to a suitable portion of the car body via the column housing 21 for rotatably holding the column shaft 20 to be the rotating axis of the steering wheel 2, and a reaction force motor (DC motor) $M_3$ is mounted to the outside of the column housing 21 so that the column housing 21 intersects the center of the axis of the reaction force motor $M_3$. Similarly to the relationship between the sub-steering motor $M_2$ mounted to the pinion housing 4 and the pinion shaft 40, the reaction force motor $M_3$ is made so that the worm connected to the output end thereof engages with the worm wheel 42 fitted in the midway of column shaft 20 in the column housing 21, and a rotating force thereof is applied to the column 20 through them, whereby a reaction force which is reverse to the operating direction of the steering wheel 2 is applied to the steering wheel 2 fixed to the upper end of the column shaft 20.

When the reaction force is applied to the steering wheel 2 by the reaction force motor $M_3$, the road surface reaction force to be actually applied to the steerable wheels 10 for steering is applied to the steering wheel 2 mockingly according to the steering so that a driver senses the reaction force in body. The motion instruction is given from the steering control unit 3 to the reaction force motor $M_3$ via the driving circuit, and the reaction force motor $M_3$ is driven according to the motion instruction.

Therefore, it is necessary to apply a steering torque which opposes the reaction force generated by the reaction force motor $M_3$ when the steering wheel 2 is rotated. The steering torque applied to the steering wheel 2 is detected by a torque sensor 22 provided to the midway portion of the column housing 21, an operating amount of the steering wheel 2 as well as an operating direction is detected by a pair of steering angle sensors 23 and 24 provided to both the sides of the reaction force motor $M_3$. The detected results are given to the steering control unit 3 as signals showing the operating state of the steering wheel 2.

The steering angle $\theta_1$ of the steering wheel 2 which is given as the detected value of the steering angle sensors 23 and 24 is an important detected value which is to be used in the steering control unit 3 in order to obtain a target value of driving torque to be generated by the main steering motor $M_1$ and sub-steering motor $M_2$ on the basis of deviation between the steering angle $\theta_1$ and the actual steering angle $\theta_2$ detected by the tie rod displacement sensor 16. In the present embodiment, a pair of the steering angle sensors 23 and 24 are provided so that control based on a mis-detected result at the time of malfunctions is prevented. At normal time, the detected value of the steering angle sensor 23 is used, and the detected value of the steering angle sensor 24 is used for fail-safe when the steering angle sensor 23 malfunctions. Here, the steering torque detected by the torque sensor 22 is used for judging a malfunction of the reaction force motor $M_3$ as a feedback signal of the reaction force generated by the reaction force motor $M_3$.

Here, a force is applied to the column shaft 20 supporting the steering wheel 2 by a centering spring provided to the inside of the column housing 21, and when the rotation of the steering wheel 2 is stopped, the steering wheel 2 is returned to a neutral position by the spring force of the centering spring applied to the column shaft 20. This return is necessary for returning the steering wheel 2 according to returning of the steerable wheels 10 in the advance direction, generated in the steering mechanism 1.

As mentioned above, the steering state which occurs actually in the steering mechanism 1 is given to the steering control unit 3 as inputs from the rotation angle sensor 15, tie rod displacement sensor 16 and tie rod axial force sensors 17, and the operating state of the steering wheel 2 as the steering operating means is given to the steering control unit 3 as inputs from the torque sensor 22 and steering angle sensors 23 and 24. In addition, outputs of vehicle speed sensors 5 and 6 for detecting a running speed of the car, output of a yaw rate sensor 7 for detecting a yaw rate of the car, output of a lateral acceleration sensor 8 for detecting a lateral acceleration of the car, and output of a forward/backward acceleration sensor 9 for detecting a forward/backward acceleration of the car are given to the input side of the steering control unit 3.

The vehicle speed sensors 5 and 6 may be, for example, rotating speed sensors for detecting a rotating speed of the front steerable wheels or rear steerable wheels corresponding to the vehicle speed. A pair of the vehicle speed sensors 5 and 6 are provided because when one malfunctions, the other is used for fail-safe similarly to the tie rod displacement sensor 16 and steering angle sensors 23 and 24. Moreover, the yaw rate sensor 7 and lateral acceleration sensor 8 are used for knowing a turning state of the car, and they are also used such that when one malfunctions, the other is used for fail-safe. At normal time, the output of the yaw rate sensor 7 is used as a signal showing the turning state.

Meanwhile, as mentioned above, the output of the steering control unit 3 is given to the main steering motor $M_1$ and sub-steering motor $M_2$ for making the steering mechanism 1 perform the steering operation, and the reaction force motor $M_3$ for applying the reaction force to the steering wheel 2 via respective driving circuits, and the main steering motor $M_1$, sub-steering motor $M_2$ and reaction force motor $M_3$ are driven respectively according to the motion instructions from the steering control unit 3.

Figure 5:
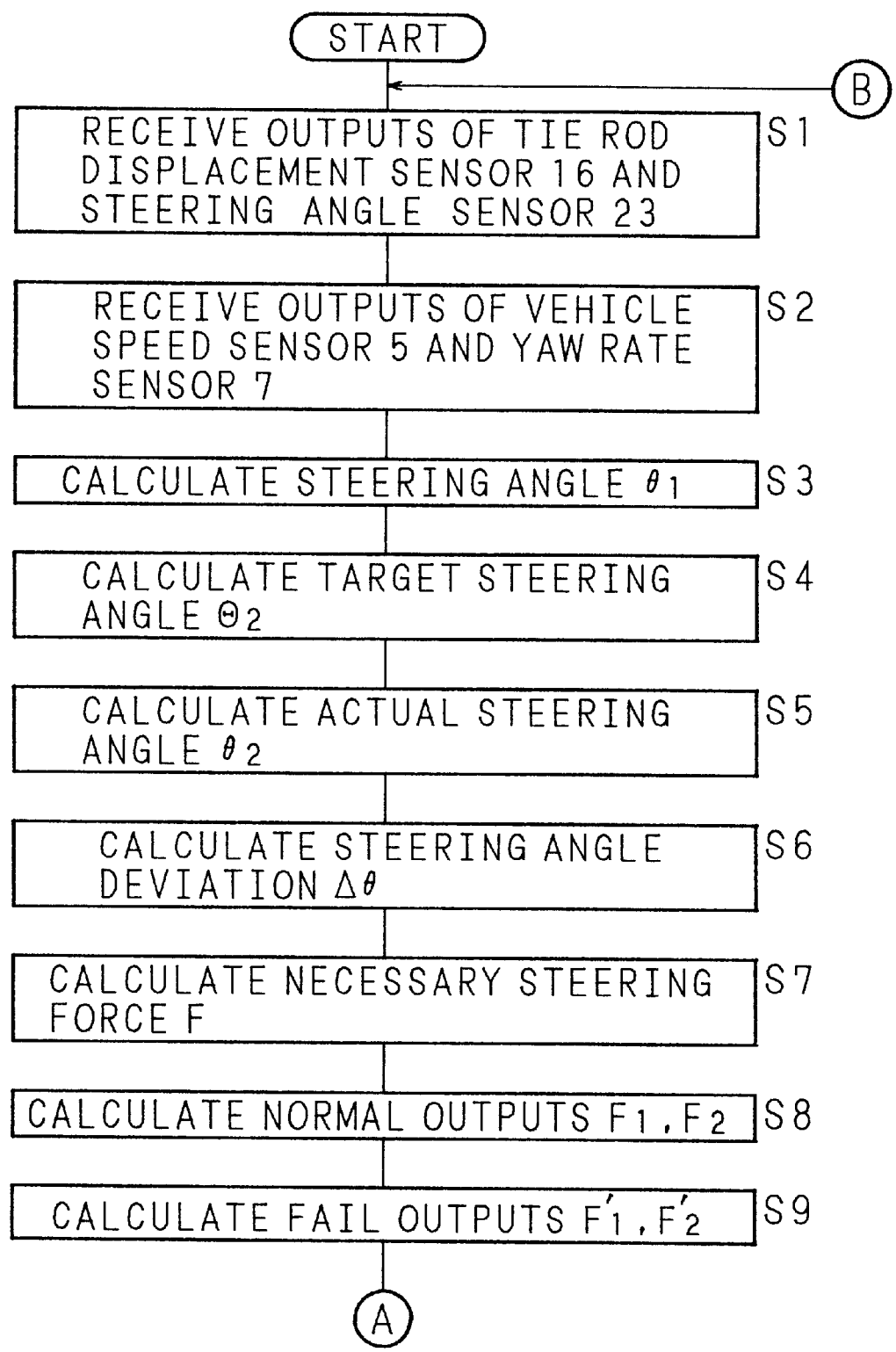
FIG. 5 is a flow chart showing control contents of the main steering motor and sub-steering motor.
Figure 6:
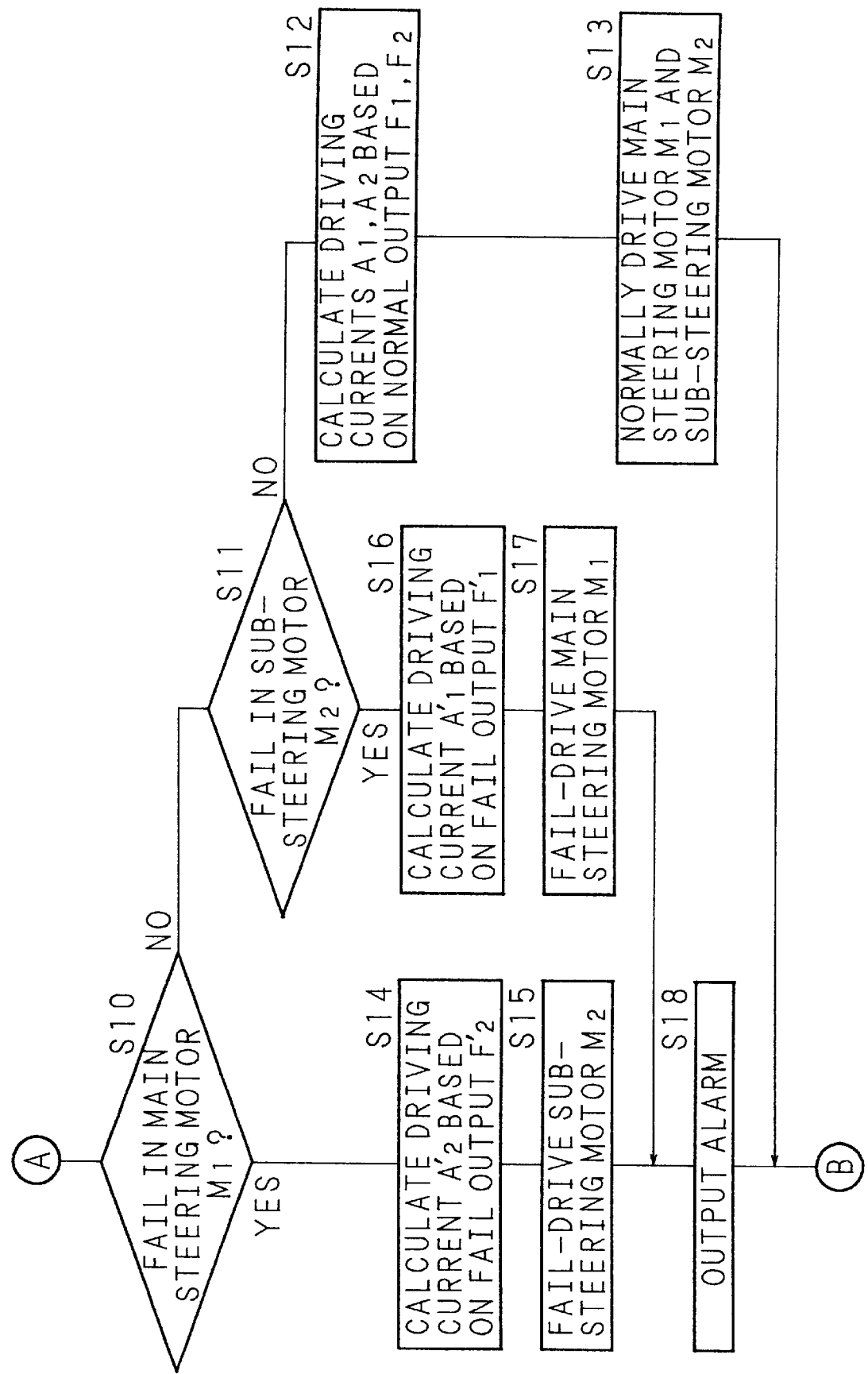
FIG. 6 is a flow chart showing control contents of the main steering motor and sub-steering motor.

The main steering motor $M_1$ and sub-steering motor $M_2$ are controlled by the steering control unit 3 according to the flow charts in FIGS. 5 and 6. The steering control unit 3 starts its operation according to a key switch on-operation for starting an engine, obtains outputs of the steering angle sensor 23 (or 24) connected to the input side and tie rod displacement sensor 16 with a prescribed sampling period (S1), and obtains outputs of the vehicle speed sensor 5 (or 6). and yaw rate sensor 7 (or lateral acceleration sensor 8) (S2).

Thereafter, the steering control unit 3 calculates the steering angle $\theta_1$ representing the operating amount of the steering wheel 2 on the basis of the input from the steering angle sensor 23 (S3), and calculates a target steering angle $\Theta$ by applying the obtained steering angle $\theta_1$ to the following equation (S4).

$$\Theta = K_0 \cdot K_1 \cdot K_2 \cdot \theta_1 \qquad (1)$$

$K_0$ in the equation (1) is proportionality constant for making the steering angle $\theta_1$ correspond to the target steering angle $\Theta$, and $K_1$ and $K_2$ are correction factors. $K_1$ is the correction factor for changing a steering characteristic according to the vehicle speed, and it is set so as to be smaller during high-speed running in which the vehicle speed exceeds a prescribed speed and to be increased proportionally, for example, according to the lowering of the vehicle speed beneath a predetermined speed, the correction factor is set according to the vehicle speed detected by the vehicle speed sensor 5. On the other hand, $K_2$ is a correction factor for changing a steering characteristic according to the turning state of the car, and it is set according to the actual yaw rate detected by the yaw rate sensor 7 so as to become smaller as the turning degree becomes larger.

Namely, the target steering angle $\Theta$ obtained at step S4 becomes smaller than the steering angle $\theta_1$ representing an operating amount of the steering wheel 2 during the high-speed running and becomes larger during the low-speed running, and becomes smaller as the car turns more abruptly.

Alternatively, in the step S4, $K_2$ can be set become larger as the turning degree becomes larger so that the target steering angle $\Theta$ becomes larger than the steering angle $\theta_1$ representing the operating amount of the steering wheel 2 as the car turns more abruptly.

Thereafter, the steering control unit 3 calculates the actual steering angle $\theta_2$ generated actually in the steering mechanism 1 on the basis of the input from the tie rod displacement sensor 16 (S5), and calculates a deviation between the actual steering angle $\theta_2$ and target steering angle $\Theta$ (a deviation of the steering angle $\Delta\theta = \Theta - \theta_2$) (S6), and obtains a necessary steering force F which is necessary for realizing the target steering angle $\Theta$ by the PID calculation based on the deviation of the steering angle $\Delta\theta$ (S7).

Thereafter, the steering control unit 3 distributes the necessary steering force F to the main steering motor $M_1$ and sub-steering motor $M_2$ and obtains normal outputs $F_1$ and $F_2$ corresponding to the respective distributed forces (S8), and further obtains fail outputs $F_1'$ and $F_2'$ which are necessary for the main steering motor $M_1$ and sub-steering motor $M_2$ individually to generate the whole amount of the necessary steering force F (S9).

The necessary steering force F is distributed to the main steering motor $M_1$ and sub-steering motor $M_2$ so that the prescribed ratio previously set of the main steering motor $M_1$ to sub-steering motor $M_2$ becomes 2:1, for example. Moreover, the fail outputs $F_1'$ and $F_2'$ are set to the maximum output to be obtained when maximum rated current is passed in the respective motors as an upper limit.

As mentioned above, after calculating the normal outputs $F_1$ and $F_2$ and fail outputs $F_1'$ and $F_2'$, the steering control unit 3 judges as to whether or not a fail exists in each of the main steering motor $M_1$ and sub-steering motor $M_2$ (S10 and S11). As a result of the judgment, when both the motors are judged to be normal, the steering control unit 3 respectively obtains driving currents $A_1$ and $A_2$ which are necessary for the main steering motor $M_1$ and sub-steering motor $M_2$ to generate the normal outputs $F_1$ and $F_2$ (S12), and outputs them so as to normally drive the main steering motor $M_1$ and sub-steering motor $M_2$ (S13). This operation is repeated until the key switch is turned off.

Here, the input from the rotation angle sensor 15 provided to the main steering motor $M_1$ to the steering control unit 3 is used for recognizing the rotating position of the main steering motor $M_1$ when the driving current $A_1$ is outputted and adjusting a phase of the driving current $A_1$.

According to the aforementioned operations, when the main steering motor $M_1$ and sub-steering motor $M_2$ are in the normally operable state (generally in this state), the necessary steering force F as a combined force of the output $F_1$ for the main steering motor $M_1$ and the output $F_2$ for the sub-steering motor $M_2$ is applied to the steering mechanism 1. Therefore, the main steering motor $M_1$ and sub-steering motor $M_2$ respectively may share the necessary steering force F, so both the motors $M_1$ and $M_2$ can be miniaturized, and thus they can be easily provided to the circumference of the steering mechanism 1.

As shown in FIG. 2, the main steering motor $M_1$ is structured integrally in the midway portion of the rack housing 14 supporting the rack shaft 11, and it can be arranged without occupying large space in the circumference of the rack shaft 11. Moreover, as shown in FIGS. 3 and 4, the sub-steering motor $M_2$ is structured so that the pinion shaft 40 engaged with the midway portion of the rack shaft 11 in the connected-type rack pinion steering apparatus in which the steering mechanism 1 is connected to the steering wheel 2 is used, and a rotation force is applied to the pinion shaft 40. Therefore, the sub-steering motor $M_2$ can be easily provided in the existing steering mechanism 1.

Here, the structures of the main steering motor $M_1$ and sub-steering motor $M_2$ are not limited to those described in the aforementioned embodiment, so needless to say, another configuration can be adopted. Moreover, in the judgment of the fail in the main steering motor $M_1$ and sub-steering motor $M_2$ at steps S10 and S11, a fail judging method normally used in various motors such that a change with time in driving currents of the motors is monitored may be used. Moreover, in the steps S10, and S11, it can be made to judge the malfunction of the parts including the steering control unit, the driving circuit and the communication means for transmitting information between steering control parts which are related to driving of each motor besides the malfunction judgement of motors.

As a result of the judgment at step S10, when the judgment is made that the main steering motor $M_1$ is in the fail state, the steering control unit 3 obtains a driving current $A_2$' which is necessary for the sub-steering motor $M_2$ on the non-malfunction side to generate the fail output $F_2$' (S14), outputs it as the motion instruction to the sub-steering motor $M_2$ so as to fail-drive the sub-steering motor $M_2$ (S15). Alternately, as a result of the judgment at S11, when the judgment is made that the sub-steering motor $M_2$ is in the fail state, the steering control unit 3 obtains the driving current $A_1$' which is necessary for the main steering motor $M_1$ on the non-malfunction state to generate the fail output $F_1$' (S16), outputs it as the motion instruction to the main steering motor $M_1$ so as to fail-drive the main steering motor $M_1$ (S17). In these cases, an alarming means connected to the output side is operated so that an alarm is outputted (S18).

By the above operation, when one of the main steering motor $M_1$ and sub-steering motor $M_2$ is in the fail state, the other is fail-driven, and thus it can be previously prevented that the steering becomes impossible. At this time, since switching into the fail output $F_1$' or $F_2$' calculated previously on the assumption that one of the steering motors $M_1$ and $M_2$ would independently generate the whole of the necessary steering force F, is performed on the steering motor $M_1$ or $M_2$ on the non-malfunction side, the one of the steering motors can promptly generate the necessary steering force F being shared by both the steering motors $M_1$ and $M_2$ before malfunction, thereby making it possible to prevent an abrupt change in the steering force.

Since the maximum outputs of the main steering motor $M_1$ and sub-steering motor $M_2$ are set as an upper limit, by which the fail outputs $F_1$' and $F_2$' are calculated, as mentioned above, the steering in the general running state can be performed without any interference. But it is occasionally difficult to generate the whole of the necessary steering force F in a special running state such as abrupt turning on a bad road. The alarm is outputted at step S18 in order to notify a driver that sufficient steering force cannot be obtained possibly.

Since the apparatus of the present invention is structured so that a pair of steering motors (main steering motor $M_1$ and sub-steering motor $M_2$) are provided to different positions in the steering mechanism 1, and the steering is performed by a combined force of their outputs, both the steering motors $M_1$ and $M_2$ can be miniaturized. Thus, their provision to a limited space around the steering mechanism 1 becomes easier. Moreover, even if one of the motors malfunctions, the steering might not be impossible, and thereby giving improved safety. Further, a sensor for detecting the values used for controlling the main steering motor $M_1$ and sub-steering motor $M_2$ is double-structured such that a pair of steering angle sensors 23 and 24 are provided. Therefore, when the structure is such that the one is used for fail-safe of the other one, the control based on false detected results is prevented.

The steering control unit 3 not only controls the main steering motor $M_1$ and sub-steering motor $M_2$ but also controls the reaction force motor $M_3$. This control is made following such a procedure that the road surface reaction force which is actually applied to the steerable wheels 10 is recognized as inputs from the tie rod axial force sensors 17, and basically the target value of the driving torque of the reaction force motor $M_3$ is determined so that a pseudo reaction force which is obtained by multiplying the inputs by a prescribed coefficient is applied to the steering wheel 2, and the motion instruction is given to the reaction force motor $M_3$ so that the target value is obtained.

At this time, the value of the vehicle speed detected by the vehicle speed sensor 5, the value of the yaw rate detected by the yaw rate sensor 7 and the value of the forward/backward acceleration detected by the forward/backward acceleration sensor 9 are used for correcting the coefficient. For example, the detected values of the vehicle speed and yaw rate are used for increasing the coefficient according to an increase in the detected values, and the detected value of the forward/backward acceleration is used for increasing the coefficient accordingly when the lowered acceleration is detected. The pseudo reaction force which is determined by using the coefficient corrected in such a manner is applied to the steering wheel 2.

As a result, the steering wheel 2 becomes heavier according to a rise in the vehicle speed and becomes lighter according to a fall in the vehicle speed, and advancing stability at high-speed running is improved and also the operating force at low-speed running and at stopping is weakened. Moreover, the steering wheel 2 becomes heavier according to an increase in the turning degree, it can give an operation feeling according to the turning state. Further, the steering wheel 2 becomes heavier when the speed is decreased, and the driver can feel an increase in the load of the front steerable wheels according to the decrease in the speed.

The above embodiment shows one example of the apparatus of the present invention, and as mentioned above, the configurations and providing states of the main steering motor $M_1$ and sub-steering motor $M_2$ are not limited, and further, the same is applied to the structure and providing state of the reaction force motor $M_3$. Moreover, needless to say, as the steering operating means, another means other than the steering wheel 2 such as a lever, hand grip and pedal can be used.

Since the apparatus of the present invention, as mentioned above, is structured so that a pair of steering motors are provided to different positions in the steering mechanism, and they are driven to obtain outputs which are obtained by distributing the necessary steering force thereto in the prescribed ratio, whereby the steering is performed by adding both the outputs, both the steering motors can be miniaturized, and the provision of the motors to the limited space around the steering mechanism becomes easier. As a result, the easy arrangement is possible.

In addition, when the judgment is made that malfunction of a pair of the steering motors exists, since the output of the steering motor on the malfunction side is forbidden and the output of the steering motor on the non-malfunction side is increased, it can be prevented that the steering becomes difficult.

Furthermore, normal output according to the distribution of the necessary steering force and fail output corresponding to the whole of the necessary steering force are always obtained for a pair of the steering motors, and when one of the steering motors malfunctions, a target value of the output of the other steering motor is changed into the fail output. For this reason, an abrupt change in the steering force before and after the malfunction can be prevented.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A steering apparatus for an automotive vehicle having two steerable vehicle wheels moveable to steer the vehicle, comprising:

steering operating means;

a steering mechanism which is not mechanically connected to said steering operating means and which has a shaft, which shaft is connected at either end with a respective vehicle wheel to move the steerable vehicle wheels;

a pair of steering motors which apply their outputs to the shaft at different positions along the shaft;

a first detector detecting an operating position of said steering operating means;

a second detector detecting an operating position of said shaft; and a steering control unit calculating a necessary steering force based on a difference between the detected operating position of the steering operating means and detected operating position of the shaft and distributing the necessary steering force in a prescribed ratio between said steering motors so as to determine target values of the outputs of said steering motors, in a normal mode of operation, both of said steering motors are driven in order to jointly produce the necessary steering force to move the pair of steerable vehicle wheels so that steering is performed according to an operation of said steering operating means.

2. A steering apparatus for an automotive vehicle having a steerable vehicle wheel moveable to steer the vehicle, comprising:

steering operating means;

a steering mechanism which is not mechanically connected to said steering operating means and which is coupled to move the steerable vehicle wheel;

a pair of steering motors which are provided to different positions in said steering mechanism and apply their outputs to said steering mechanism;

a first detector detecting an operating position of said steering operating means;

a second detector detecting an operating position of said steering mechanism; and a steering control unit calculating a necessary steering force based on a difference between the detected operating position of the steering operating means and detected operating position of the steering mechanism and distributing the necessary steering force in a prescribed ratio between said steering motors so as to determine target values of the outputs of said steering motors, whereby, in a normal mode of operation in which both steering motors are operative, both of said steering motors are driven in order to jointly produce the necessary steering force to move the steerable vehicle wheel so that steering is performed according to an operation of said steering operating means wherein said steering control unit includes:

a malfunction sensor actuable upon failure of said steering motors to operate; and a fail-safe inhibitor operative upon actuation of the malfunction sensor and inhibiting the output of the steering motor on the malfunction side and changing the distribution ratio so that the output of the steering motor on the non-malfunction side is increased.

3. The steering apparatus for automobiles according to claim 2, wherein:

said steering control unit calculates a normal mode output according to the distribution ratio and a fail mode output corresponding to all of the steering force for each of said steering motors, and said fail-safe inhibitor changing the normal mode output to the fail mode output for the steering motor on the non-malfunction side.

4. A steering apparatus for an automotive vehicle having two steerable vehicle wheels moveable to steer the vehicle by means of the movement of a shaft which extends between and is connected to the wheels, comprising:

steering operating means;

the shaft being free of a mechanical connection to said steering operating means;

a pair of steering motors which apply a moving force to the shaft at different positions along the shaft; and a steering control unit calculating a necessary steering force based on a difference between an operating position of the steering operating means and an operating position of the shaft, the steering control unit distributing the necessary steering force between said steering motors so that the outputs of said steering motors may be different, both of said steering motors being driven in order to jointly produce the necessary steering force to move the steerable vehicle wheels so that steering is performed according to the operation of said steering operating means.

* * * * *